Sept. 30, 1930.  H. ROTH  1,777,227
AUTOMATIC BAG WEIGHING MACHINE
Filed Jan. 7, 1930
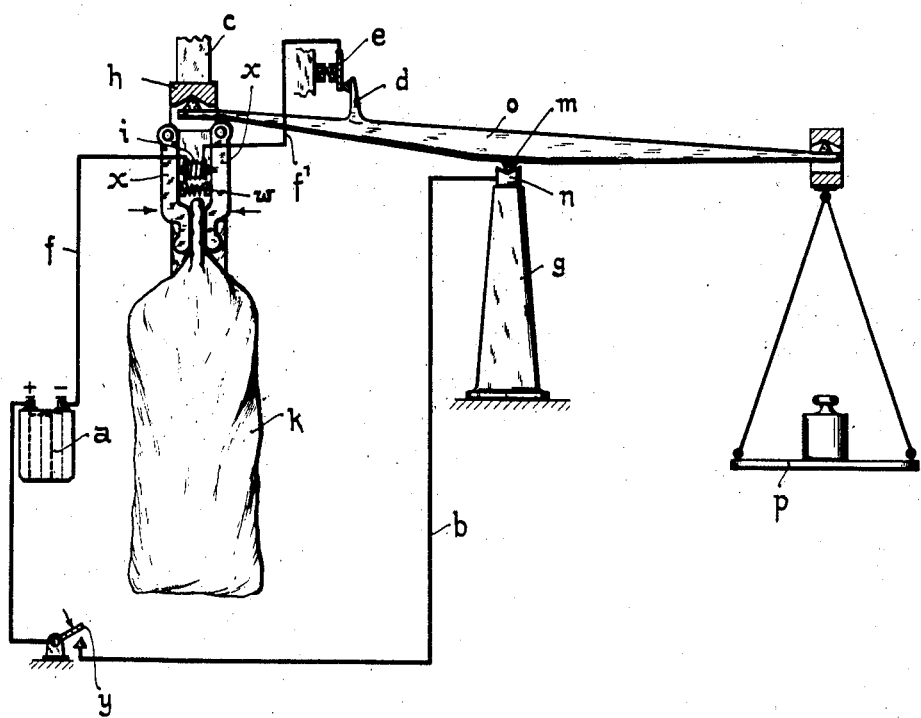
Inventor:
Hugo Roth,
by A. W. Dahm,
Attorney.

Patented Sept. 30, 1930

1,777,227

UNITED STATES PATENT OFFICE

HUGO ROTH, OF BRUNSWICK, GERMANY, ASSIGNOR TO "MIAG" MUHLENBAU UND INDUSTRIE AKTIENGESELLSCHAFT, OF FRANKFORT-ON-THE-MAIN, GERMANY

AUTOMATIC BAG-WEIGHING MACHINE

Application filed January 7, 1930, Serial No. 419,126, and in Germany December 31, 1928.

My invention relates to improvements in automatic bag weighing machines, and the object of the improvements is to provide a weighing machine intended primarily for use with paper bags, though not limited thereto, in which the bag after being filled to the desired weight is automatically released from the material supplying trunk, the means for releasing the bag preferably comprising electromagnetically operated means.

For the purpose of explaining the invention an example embodying the same has been illustrated in the accompanying drawing showing the weighing machine in a diagrammatical way.

In the example shown in the figure the weighing machine comprises a pillar $g$ carrying a socket $n$ on which the scale beam $o$ or other suitable arm of the weighing machine is supported by means of a knife edge $m$. From the right-hand end of the beam $o$ weight or a pan $p$ carrying the weight or weights is suspended, and from the left-hand side a bail $h$ is suspended. On the said bail two arms $x, x$ are rockingly mounted which are adapted to clamp the bag $k$ between the same. A spring $w$ tends to spread the arms $x, x$ for releasing the bag. An electromagnet $i$ is mounted on the bail $h$ and this electromagnet serves to draw the arms together when the bag is to be clamped between them, the electromagnet being of strength sufficient to compress the spring and draw the arms together so as to hold the bag securely. The material to be weighed is supplied to the bag through a trunk or pipe $c$.

The winding of the electromagnet $i$ is connected by a lead $f$ with a source of electric energy $a$, a switch $y$, a lead $b$ and the socket $n$. To the beam a contact $d$ is fixed which is adapted to engage a relatively fixed contact $e$ connected by a lead $f^1$ with the second terminal of the electromagnet $i$.

The operation of the weighing machine is as follows:

The bag to be filled is placed with its mouth on the trunk $c$, and the arms $x, x$ are placed into position for clamping the upper rim of the bag. Now the switch $y$ is closed, so that current is supplied to the winding of the electromagnet $i$ from the source $a$ through the lead $b$, the socket bearing $n$, the beam $o$, the contact $d$, the relatively fixed contact $e$ engaging the same, and the lead $f^1$ and then back to the source of current through lead $f$. Thereby the arms $x, x$ are pulled together against the tension of the spring $w$ for clamping the bag. Now the material is permitted to flow into the bag, and as the left-hand arm of the scale beam begins its downward movement, the contacts $d, e$ remain at first in sliding engagement, and only after the desired weight of material has been supplied to the bag does the contact $d$ leave the relatively fixed contact $e$ thus interrupting the circuit of the electromagnet and allowing the bag $k$ to be released from the clamping arms $x, x$ and the trunk $c$.

In lieu of the electromagnet solenoids may be provided and it will be understood that other changes may be made in the device of my invention, as will be obvious to those skilled in the art, all without departing from the spirit of the invention.

I claim:

1. The herein described weighing machine, comprising a scale arm, electromagnetically operated clamping means on said arm adapted to hold a bag, means for supplying material to said bag, a switch in the circuit of said electromagnetic means, and means controlled by the movement of said arm for opening the switch when the bag attains a predetermined weight.

2. The herein described weighing machine, comprising a scale arm, electromagnetically operated clamping means on said arm adapted to grasp a bag at its upper rim, means for supplying material to said bag, a switch in the circuit of said electromagnetic means, and means operated by the movement of said arm for opening said switch when the bag has been filled to a predetermined extent.

In testimony whereof I affix my signature.

HUGO ROTH.